US009985789B2

(12) United States Patent
Clish et al.

(10) Patent No.: US 9,985,789 B2
(45) Date of Patent: *May 29, 2018

(54) AUTHENTICATION BETWEEN INDUSTRIAL ELEMENTS IN AN INDUSTRIAL CONTROL SYSTEM

(71) Applicant: Bedrock Automation Platforms Inc., San Jose, CA (US)

(72) Inventors: Timothy Clish, Taunton, MA (US); Samuel Galpin, Westford, MA (US); James G. Calvin, Attleboro, MA (US); Albert Rooyakkers, Sunnyvale, CA (US)

(73) Assignee: Bedrock Automation Platforms Inc., Mansfield, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/287,937

(22) Filed: Oct. 7, 2016

(65) Prior Publication Data
US 2017/0093584 A1 Mar. 30, 2017

Related U.S. Application Data

(63) Continuation of application No. 14/519,047, filed on Oct. 20, 2014, now Pat. No. 9,467,297, which is a
(Continued)

(51) Int. Cl.
*H04L 9/32* (2006.01)
*G06F 21/44* (2013.01)
(Continued)

(52) U.S. Cl.
CPC .......... *H04L 9/3263* (2013.01); *G06F 21/445* (2013.01); *H04L 9/14* (2013.01);
(Continued)

(58) Field of Classification Search
CPC ....... H04L 9/3263; H04L 9/3273; H04L 9/30; H04L 63/0823; H04L 67/12; G06F 21/1445; G06F 2212/175
See application file for complete search history.

(56) References Cited

U.S. PATENT DOCUMENTS

6,219,789 B1 4/2001 Little et al.
6,480,963 B1 11/2002 Tachibana et al.
(Continued)

FOREIGN PATENT DOCUMENTS

CN 102480352 A 5/2012
JP 3370931 B2 11/1999
(Continued)

OTHER PUBLICATIONS

Azfirovic-Vukotic, M. et al., "Secure SCADA network supporting NERC CIP", Power & Energy Society General Meeting 2009, PES '09, IEEE, Piscataway, NJ, USA, Jul. 26, 2009, pp. 1-8, XP031538542.
(Continued)

*Primary Examiner* — Robert B Leung
(74) *Attorney, Agent, or Firm* — Advent, LLP

(57) ABSTRACT

A set of redundant industrial control system communications/control modules includes at least a first communications/control module and a second communications/control module. The first and second communications/control modules are configured to perform an authentication sequence including: transmitting a request datagram from the first communications/control module to the second communications/control module, the request datagram including a first nonce, a first device authentication key certificate, and a first identity attribute certificate; transmitting a response datagram from the second communications/control module to the first communications/control module, the response datagram including a second nonce, a first signature associated
(Continued)

with the first and second nonces, a second device authentication key certificate, and a second identity attribute certificate; and transmitting an authentication datagram from the first communications/control module to the second communications/control module when the response datagram is valid, the authentication datagram including a second signature associated with the first and second nonces.

18 Claims, 5 Drawing Sheets

Related U.S. Application Data continuation-in-part of application No. 14/469,931, filed on Aug. 27, 2014, now Pat. No. 9,191,203, and a continuation-in-part of application No. 14/446,412, filed on Jul. 30, 2014, and a continuation-in-part of application No. PCT/US2013/053721, filed on Aug. 6, 2013.

(60) Provisional application No. 62/021,438, filed on Jul. 7, 2014.

(51) Int. Cl.
*H04L 9/14* (2006.01)
*H04L 9/30* (2006.01)
*H04L 29/06* (2006.01)
*H04L 29/08* (2006.01)

(52) U.S. Cl.
CPC ............ *H04L 9/30* (2013.01); *H04L 63/0823* (2013.01); *H04L 63/164* (2013.01); *G06F 2212/175* (2013.01); *H04L 67/12* (2013.01)

(56) References Cited

U.S. PATENT DOCUMENTS

| | | | |
|---|---|---|---|
| 6,643,777 B1 | 11/2003 | Chu | |
| 7,536,548 B1 | 5/2009 | Batke et al. | |
| 7,660,998 B2 | 2/2010 | Walmsley | |
| 7,746,846 B2 | 6/2010 | Boora et al. | |
| 7,822,994 B2 | 10/2010 | Hamaguchi | |
| 7,971,052 B2 | 6/2011 | Lucas et al. | |
| 8,032,745 B2 | 10/2011 | Bandholz et al. | |
| 8,132,231 B2 | 3/2012 | Amies et al. | |
| 8,181,262 B2 | 5/2012 | Cooper et al. | |
| 8,694,770 B1 * | 4/2014 | Osburn, III | G05B 19/042 713/153 |
| 2002/0095573 A1 | 7/2002 | O'Brien | |
| 2005/0102535 A1 | 5/2005 | Patrick et al. | |
| 2005/0144437 A1 * | 6/2005 | Ransom | G06F 1/28 713/151 |
| 2005/0229004 A1 * | 10/2005 | Callaghan | G06F 21/33 713/185 |
| 2008/0077976 A1 * | 3/2008 | Schulz | H04L 9/0822 726/5 |
| 2009/0083843 A1 | 3/2009 | Wilkinson, Jr. et al. | |
| 2009/0217043 A1 | 8/2009 | Metke et al. | |
| 2010/0122081 A1 | 5/2010 | Sato et al. | |
| 2012/0102334 A1 | 4/2012 | O'Loughlin et al. | |
| 2013/0212390 A1 | 8/2013 | Du et al. | |
| 2013/0291085 A1 | 10/2013 | Chong et al. | |
| 2014/0068712 A1 * | 3/2014 | Frenkel | H04L 63/126 726/3 |
| 2014/0280520 A1 * | 9/2014 | Baier | H04L 67/02 709/203 |

FOREIGN PATENT DOCUMENTS

| | | |
|---|---|---|
| JP | 4439340 B2 | 11/2005 |
| JP | 2007096817 A | 4/2007 |
| KR | 20020088540 A | 11/2002 |
| KR | 100807377 B1 | 2/2005 |
| KR | 20060034244 A | 4/2006 |
| KR | 100705380 B1 | 4/2007 |
| TW | 201310344 A | 3/2013 |

OTHER PUBLICATIONS

CGI, White Paper on "Public Key Encryption and Digital Signature: How do they work?", 2004 (refer to pp. 3-4).
European Search Report dated Dec. 2, 2015 for EP Application No. 14196408.0.
Keith, S. et al. "Guide to Industrial Control Systems (ICS) Security," NIST, Special Pub. 800-82, Jun. 2011, (refer to 2-1 to 2-10).
Molva, R. Ed et al., "Internet security architecture", Computer Networks, Elsevier Science Publishers B. V., Amsterdam, NL, vol. 31, No. 8, Apr. 23, 1999, pp. 787-804, XP004304518.
Rodrigues, A., "SCADA Security Device: Design and Implementation," Master of Science Thesis, Wichita State University, Dec. 2011.
Rodrigues, Aniket et al., "SCADA security device", Proceedings of the Seventh Annual Workshop on Cyber Security and Information Intelligence Research, CSIIRW '11, Jan. 1, 2011, p. 1, XP55230335, New York, New York, USA.

* cited by examiner

AUTHENTICATION BETWEEN INDUSTRIAL ELEMENTS IN AN INDUSTRIAL CONTROL SYSTEM

CROSS-REFERENCE TO RELATED APPLICATIONS

The present application is a continuation of U.S. patent application Ser. No. 14/519,047, which is a continuation-in-part of International Application No. PCT/US2013/053721, filed Aug. 6, 2013, and titled, "SECURE INDUSTRIAL CONTROL SYSTEM." U.S. patent application Ser. No. 14/519,047 is also a continuation-in-part under 35 U.S.C. § 120 of U.S. patent application Ser. No. 14/469,931, filed Aug. 27, 2014, and titled "SECURE INDUSTRIAL CONTROL SYSTEM." U.S. patent application Ser. No. 14/519,047 is also a continuation-in-part under 35 U.S.C. § 120 of U.S. patent application Ser. No. 14/446,412, filed Jul. 30, 2014, and titled "INDUSTRIAL CONTROL SYSTEM CABLE," which claims priority under 35 U.S.C. § 119(e) of U.S. Provisional Application Ser. No. 62/021,438, filed Jul. 7, 2014, and titled "INDUSTRIAL CONTROL SYSTEM CABLE." U.S. Provisional Application Ser. No. 62/021,438; U.S. patent application Ser. Nos. 14/446,412 and 14/469,931; and International Application No. PCT/US2013/053721 are herein incorporated by reference in their entireties.

BACKGROUND

Industrial control systems, such as standard industrial control systems (ICS) or programmable automation controllers (PAC), include various types of control equipment used in industrial production, such as supervisory control and data acquisition (SCADA) systems, distributed control systems (DCS), programmable logic controllers (PLC), and industrial safety systems certified to safety standards such as IEC1508. These systems are used in industries including electrical, water and wastewater, oil and gas production and refining, chemical, food, pharmaceuticals and robotics. Using information collected from various types of sensors to measure process variables, automated and/or operator-driven supervisory commands from the industrial control system can be transmitted to various actuator devices such as control valves, hydraulic actuators, magnetic actuators, electrical switches, motors, solenoids, and the like. These actuator devices collect data from sensors and sensor systems, open and close valves and breakers, regulate valves and motors, monitor the industrial process for alarm conditions, and so forth.

In other examples, SCADA systems can use open-loop control with process sites that may be widely separated geographically. These systems use Remote Terminal Units (RTUs) to send supervisory data to one or more control centers. SCADA applications that deploy RTU's include fluid pipelines, electrical distribution and large communication systems. DCS systems are generally used for real-time data collection and continuous control with high-bandwidth, low-latency data networks and are used in large campus industrial process plants, such as oil and gas, refining, chemical, pharmaceutical, food and beverage, water and wastewater, pulp and paper, utility power, and mining and metals. PLCs more typically provide Boolean and sequential logic operations, and timers, as well as continuous control and are often used in stand-alone machinery and robotics. Further, ICE and PAC systems can be used in facility processes for buildings, airports, ships, space stations, and the like (e.g., to monitor and control Heating, Ventilation, and Air Conditioning (HVAC) equipment and energy consumption). As industrial control systems evolve, new technologies are combining aspects of these various types of control systems. For instance, PACs can include aspects of SCADA, DCS, and PLCs.

SUMMARY

According to various embodiments of this disclosure, a secure industrial control system includes one or more industrial elements and a set of redundant communications/control modules that drive the one or more industrial elements. The set of redundant communications/control modules includes at least a first communications/control module and a second communications/control module. The first and second communications/control modules are configured to perform an authentication sequence (sometimes referred to as a "handshake") including the operations of: transmitting a request datagram from the first communications/control module to the second communications/control module, the request datagram including a first nonce, a first device authentication key certificate, and a first identity attribute certificate; transmitting a response datagram from the second communications/control module to the first communications/control module, the response datagram including a second nonce, a first signature associated with the first and second nonces, a second device authentication key certificate, and a second identity attribute certificate; and transmitting an authentication datagram from the first communications/control module to the second communications/control module when the response datagram is valid, the authentication datagram including a second signature associated with the first and second nonces.

In some embodiments, each communications/control module performs an authentication sequence. Requiring redundant elements to authenticate one another can prevent events that degrade system security. For example, authentication by one or more peer communications/control modules may prevent counterfeit or hacked communications/control modules being maliciously or unintentionally introduced into the system. Should the first communications/control module and the second communications/control module fail to complete the authentication sequence, the newly introduced device and/or both devices can be partially or completely disabled to prevent a security breach or other harm resulting therefrom (e.g., manufacturing defects, deviated control parameters, malicious interference, data loss/corruption, and so forth).

The first communications/control module includes at least one processor and a non-transitory medium bearing a set of instructions executable by the processor. The set of instructions includes instructions to: send a request datagram to the second communications/control module, the request datagram including a first nonce, a first device authentication key certificate, and a first identity attribute certificate; receive a response datagram from the second communications/control module, the response datagram including a second nonce, a first signature associated with the first and second nonces, a second device authentication key certificate, and a second identity attribute certificate; and send an authentication datagram to the second communications/control module when the response datagram is valid, the authentication datagram including a second signature associated with the first and second nonces.

The second communications/control module includes at least one processor and a non-transitory medium bearing a set of instructions executable by the processor. The set of instructions includes instructions to: receive a request datagram from the first communications/control module, the request datagram including a first nonce, a first device authentication key certificate, and a first identity attribute certificate; and send a response datagram to the first communications/control module when the request datagram is valid, the response datagram including a second nonce, a first signature associated with the first and second nonces, a second device authentication key certificate, and a second identity attribute certificate. The second communications/control module can be further configured to: receive an authentication datagram from the first communications/control module, the authentication datagram including a second signature associated with the first and second nonces; and send a responsive authentication datagram to the first communications/control module, the responsive authentication datagram including a signature associated with the first nonce and a success or failure message.

This Summary is provided to introduce a selection of concepts in a simplified form that are further described below in the Detailed Description. (This Summary is not intended to identify key features or essential features of the claimed subject matter, nor is it intended to be used as an aid in determining the scope of the claimed subject matter.)

DRAWINGS

The Detailed Description is described with reference to the accompanying figures. The use of the same reference numbers in different instances in the description and the figures may indicate similar or identical items.

DETAILED DESCRIPTION

Overview

In industrial control systems, various industrial elements/subsystems (e.g., input/output (I/O) modules, power modules, process sensors and/or actuators, switches, workstations, and/or physical interconnect devices) are controlled or driven by control elements/subsystems (e.g., communications/control modules). Two or more communications/control modules can operate in parallel and/or in a "master-slave" configuration to achieve enhanced throughput and/or redundancy (i.e., one control module takes over when the other one fails). In cases where a control subsystem includes two or more redundant communications/control modules, the industrial control system can be more vulnerable to counterfeit, hacked, or otherwise unauthorized (e.g., non-OEM) communications/control modules being introduced, particularly where a handoff occurs between a primary "master" communications/control module to a secondary "slave" communications/control module. For example, the master may unknowingly handoff control to an unauthorized slave during a failure or overload event. This can lead to degraded security and/or performance from manufacturing defects, deviated control parameters, malicious interference, data loss/corruption, and so forth.

The present disclosure is directed to industrial control system communications/control modules, subsystems and techniques for preventing unauthorized devices from being introduced into an industrial control system. In implementations, two or more redundant communications/control modules (e.g., a first communications/control module and a second communications/control module) are configured to perform an authentication sequence (sometimes referred to as a "handshake") when a new communications/control module is installed, at startup/reset, periodically, at scheduled times, and/or other predefined events. When the redundant communications/control modules fail to authenticate one another, at least one of the communications/control modules (e.g., the unauthenticated communications/control module) can be partially or completely disabled and/or restricted from communicating with other devices.

Example Implementations

Figure 1:
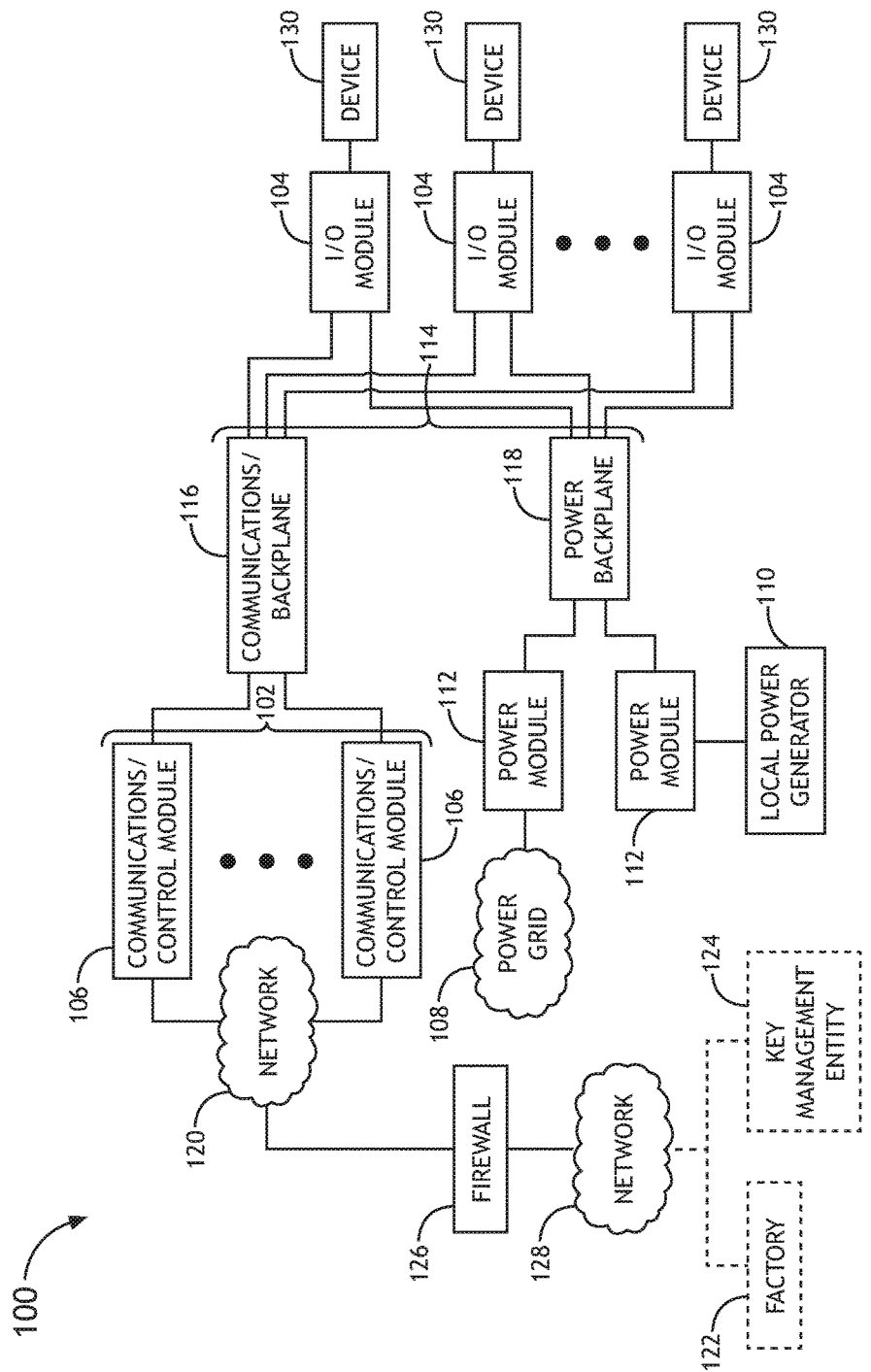
FIG. 1 is a block diagram illustrating an industrial control system including a set of redundant communications/control modules in accordance with example embodiments of the present disclosure.

FIG. 1 illustrates an industrial control system 100 in accordance with an example embodiment of the present disclosure. In embodiments, the industrial control system 100 may comprise an industrial control system (ICS), a programmable automation controller (PAC), a supervisory control and data acquisition (SCADA) system, a distributed control system (DCS), programmable logic controller (PLC), and industrial safety system certified to safety standards such as IEC1508, or the like. As shown in FIG. 1, the industrial control system 100 includes one or more industrial elements (e.g., input/output modules, power modules, sensors, actuators, switches, workstations, and/or physical interconnect devices) that are controlled or driven by one or more control elements or subsystems 102 distributed throughout the system. In some embodiments, a control element or subsystem 102 includes a set of redundant communications/control modules 106, where the communications/control modules 106 are enabled to operate in parallel and/or takeover control for one another in case of a failure/overload event. For example, one or more I/O modules 104 may be connected to a set of redundant communications/control modules 106 making up the control element/subsystem 102. The industrial control system 100 is configured to transmit data to and from the I/O modules 104. The I/O modules 104 can comprise input modules, output modules, and/or input and output modules. For instance, input modules can be used to receive information from input devices 130 (e.g., sensors) in the process, while output modules can be used to transmit instructions to output devices (e.g., actuators). For example, an I/O module 104 can be connected to a process sensor for measuring pressure in piping for a gas plant, a refinery, and so forth and/or connected to a process actuator for controlling a valve, binary or multiple state switch, transmitter, or the like. Field devices 130 are communicatively coupled with the IO modules 104 either directly or via network connections. These devices 130 can include control valves, hydraulic actuators, magnetic actuators, motors, solenoids, electrical switches, transmitters, input sensors/receivers (e.g., illumination, radiation, gas, temperature, electrical, magnetic, and/or acoustic sensors) communications sub-busses, and the like.

In implementations, the I/O modules 104 can be used the industrial control system 100 collect data in applications including, but not necessarily limited to critical infrastructure and/or industrial processes, such as product manufacturing and fabrication, utility power generation, oil, gas, and chemical refining; pharmaceuticals, food and beverage, pulp and paper, metals and mining and facility and large campus industrial processes for buildings, airports, ships, and space stations (e.g., to monitor and control Heating, Ventilation, and Air Conditioning (HVAC) equipment and energy consumption).

In implementations, an I/O module 104 can be configured to convert analog data received from the sensor to digital data (e.g., using Analog-to-Digital Converter (ADC) circuitry, and so forth). An I/O module 104 can also be connected to one or more process actuators such as a motor or a regulating valve or an electrical relay and other forms of actuators and configured to control one or more operating characteristics of the motor, such as motor speed, motor torque, or position of the regulating valve or state of the electrical relay and so forth. Further, the I/O module 104 can be configured to convert digital data to analog data for transmission to the actuator (e.g., using Digital-to-Analog (DAC) circuitry, and so forth). In implementations, one or more of the I/O modules 104 can comprise a communications module configured for communicating via a communications sub-bus, such as an Ethernet bus, an H1 field bus, a Process Field Bus (PROFIBUS), a Highway Addressable Remote Transducer (HART) bus, a Modbus, and so forth. Further, two or more I/O modules 104 can be used to provide fault tolerant and redundant connections for various field devices 130 such as control valves, hydraulic actuators, magnetic actuators, motors, solenoids, electrical switches, transmitters, input sensors/receivers (e.g., illumination, radiation, gas, temperature, electrical, magnetic, and/or acoustic sensors) communications sub-busses, and the like.

Each I/O module 104 can be provided with a unique identifier (ID) for distinguishing one I/O module 104 from another I/O module 104. In implementations, an I/O module 104 is identified by its ID when it is connected to the industrial control system 100. Multiple I/O modules 104 can be used with the industrial control 100 to provide redundancy. For example, two or more I/O modules 104 can be connected to a process sensor and/or actuator. Each I/O module 104 can include one or more ports that furnish a physical connection to hardware and circuitry included with the I/O module 104, such as a printed circuit board (PCB), and so forth. For example, each I/O module 104 includes a connection for a cable that connects the cable to a printed wiring board (PWB) in the I/O module 104.

One or more of the I/O modules 104 can include an interface for connecting to other networks including, but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Further, one or more of the I/O modules 104 can include a connection for connecting an I/O module 104 to a computer bus, and so forth.

The communications/control module 106 can be used to monitor and control the I/O modules 104, and to connect two or more I/O modules 104 together. In embodiments of the disclosure, a communications/control module 106 can update a routing table when an I/O module 104 is connected to the industrial control system 100 based upon a unique ID for the I/O module 104. Further, when multiple redundant I/O modules 104 are used, each communications/control module 106 can implement mirroring of informational databases regarding the I/O modules 104 and update them as data is received from and/or transmitted to the I/O modules 104. As discussed above, two or more communications/control modules 106 are used to provide redundancy. The communications/control modules 106 are configured to perform an authentication sequence or handshake to authenticate one another at predefined events or times including such as startup, reset, installation of a new communications/control module 106, replacement of a communications/control module 106, periodically, scheduled times, and the like.

Figure 2:
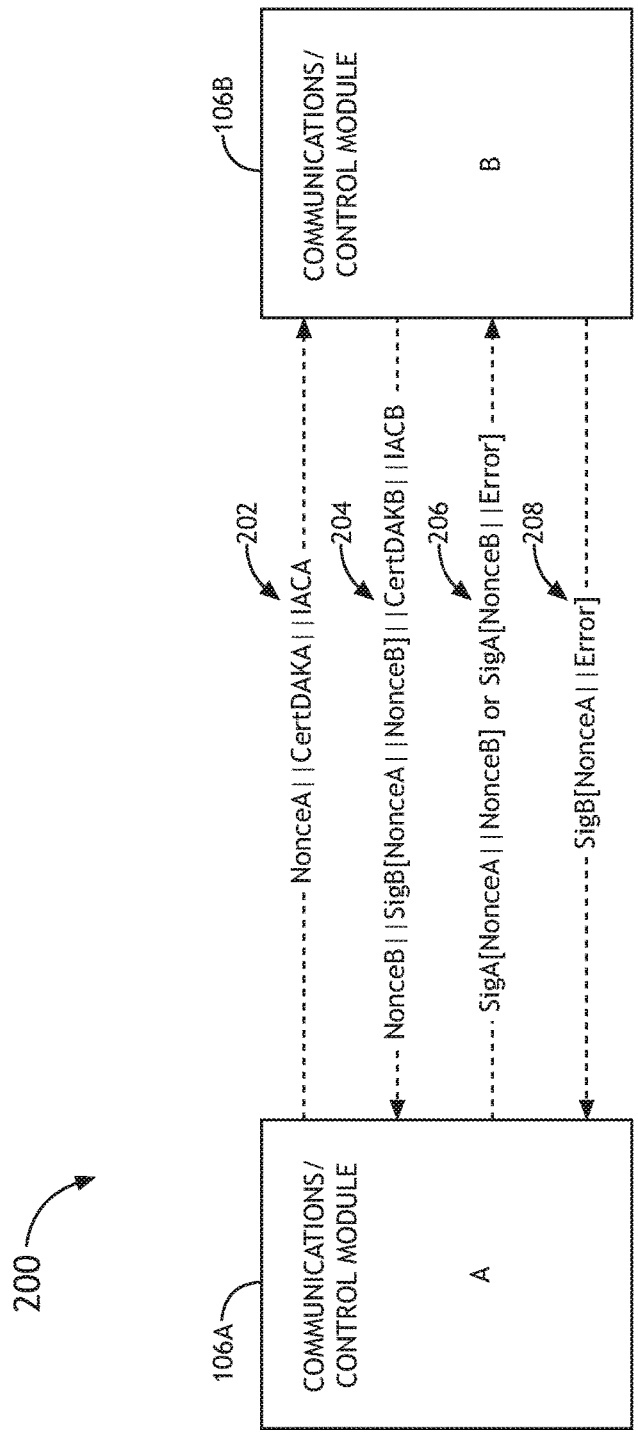
FIG. 2 is a block diagram illustrating a first communications/control module performing an authentication sequence with a second communications/control module in accordance with example embodiments of the present disclosure.

FIG. 2 shows exemplary datagrams 200 transmitted between a first communications/control module 106A and a second communications/control module 106B in performance of the authentication sequence. To initiate the authentication sequence, the first communications/control module 106A is configured to transmit a request datagram 202 to the second communications/control module 106B. In implementations, the request datagram 202 includes a first plain text nonce (NonceA), a first device authentication key certificate (CertDAKA) containing a first device authentication key (DAKA), and a first identity attribute certificate (IACA). In some embodiments, the first communications/control module 106A is configured to generate the first nonce (NonceA) with a true random number generator (hereinafter "TRNG") and concatenate or otherwise combine the first nonce (NonceA), the first device authentication key certificate (CertDAKA), and the first identity attribute certificate (IACA) to generate the request datagram 202. In some embodiments, the first device authentication key certificate (CertDAKA) and the first identity attribute certificate (IACA) are locally stored by the first communications/control module 106A. For example, the certificates may be stored in a local memory (e.g., ROM, RAM, flash memory, or other non-transitory storage medium) of the first communications/control module 106A.

The second communications/control module 106B is configured to validate the request datagram by verifying the first device authentication key certificate (CertDAKA) and the first identity attribute certificate (IACA) with public keys that are generated by a device lifecycle management system (DLM) or derived utilizing crypto library functions. In this regard, the public keys may be stored in SRAM or another local memory of the communications/control module 106 and used with crypto library functions to verify or cryptographically sign exchanged data, such as the nonces exchanged between the communications/control modules 106. In some embodiments, the second communications/control module 106B may verify the certificates with an elliptic curve digital signing algorithm (hereinafter "ECDSA") or other verification operation. In some embodiments, the second communications/control module 106B may be further configured to validate the certificate values from plain text values by verifying the following: certificate type is device authentication key (hereinafter "DAK") or identity attribute certificate (hereinafter "IAC") for each certificate; IAC names match, DAK certificate module type matches module type argument; and/or microprocessor serial number (hereinafter "MPSN") of each certificate in the message payload match each other. In some embodiments, the second communications/control module 106B may be further configured to verify the DAK and IAC certificates are not in a local revocation list (e.g., a list or database including revoked and/or invalid certificates). When the second communications/control module 106B fails to validate the request datagram, the second communications/control module 106B may generate an error message, partially or completely disable the first communications/control module 106A, and/or discontinue or restrict communications to/from the first communications/control module 106A.

Responsive to a valid request datagram 202, the second communications/control module 106B is configured to transmit a response datagram 204 to the first communications/control module 106A. In implementations, the response datagram 204 includes a second plain text nonce (NonceB), a first signature associated with the first and second nonces (SigB[NonceA||NonceB]), a second device authentication key certificate (certDAKB) containing a second device authentication key (DAKB), and a second identity attribute certificate (IACB). In some embodiments, the second communications/control module 106B is configured to generate the second nonce (NonceB) with a TRNG, concatenate or otherwise combine the first nonce (NonceA) and the second nonce (NonceB), and sign the concatenated/combined nonces with a private key (e.g., DAK) that is locally stored by the second communications/control module 106B. The second communications/control module 106B is further configured to concatenate or otherwise combine the second nonce (NonceB), the first signature associated with the first and second nonces (SigB[NonceA||NonceB]), the second device authentication key certificate (certDAKB), and the second identity attribute certificate (IACB) to generate the response datagram 204. In some embodiments, the second device authentication key certificate (CertDAKB) and the second identity attribute certificate (IACB) are locally stored by the second communications/control module 106B. For example, the certificates may be stored in a local memory (e.g., ROM, RAM, flash memory, or other non-transitory storage medium) of the second communications/control module 106B.

The first communications/control module 106A is configured to validate the response datagram by verifying the second device authentication key certificate (CertDAKB) and the second identity attribute certificate (IACB) with public keys that are locally stored or retrieved from a crypto library utilizing ECDSA or another verification operation. In some embodiments, the first communications/control module 106A may be further configured to validate the certificate values from plain text values by verifying the following: IAC & DAK certificates have matching MPSNs, IAC names match, certificate types are correct on both certificates (IAC & DAK), the correct issuer name is on both certificates, DAK module type is the correct type (e.g., check to see if module type=communications/control module). In some embodiments, the first communications/control module 106A may be further configured to verify the DAK and IAC certificates are not in a local revocation list.

To validate the response datagram, the first communications/control module 106A is further configured to verify the first signature associated with the first and second nonces (sigB[NonceA||NonceB]). In some embodiments, the first communications/control module 106A is configured to verify the first signature (sigB[NonceA||Nonce B]) by concatenating the first locally stored nonce (NonceA) and the second plaintext nonce (NonceB) received from the second communications/control module 106B, verifying the first cryptographic signature (sigB[NonceA||NonceB]) with a public device authentication key (e.g., using DAKB from certDAKB), and comparing the locally generated concatenation of the first nonce and the second nonce with the cryptographically verified concatenation of the first nonce and the second nonce. When the first communications/control module 106A fails to validate the response datagram, the first communications/control module 106A may generate an error message, partially or completely disable the second communications/control module 106B, and/or discontinue or restrict communications to/from the second communications/control module 106B.

The first communications/control module 106A is further configured to transmit an authentication datagram 206 to the second communications/control module 106B when the response datagram 204 is valid. In implementations, the authentication datagram 206 includes a second signature associated with the first and second nonces (sigA[NonceA||Nonce B]). In some embodiments, the first communications/control module 106A is configured to sign the locally generated concatenation of the first and second nonces a private key (e.g., DAK) that is locally stored by the first communications/control module 106A. When the response datagram is invalid, the authentication datagram 206 may be replaced with a "failed" authentication datagram 206 including a signature associated with the second nonce and an error reporting (e.g., "failure") message (sigA[NonceB||Error]) generated by the first communications/control module 106A.

Responsive to the authentication datagram 206, the second communications/control module 106B may be further configured to transmit a responsive authentication datagram 208 to the first communications/control module 106A. In implementations, the responsive authentication datagram 208 includes a signature associated with the first nonce and an error reporting (e.g., "success" or "failure") message (sigB[NonceA||Error]) generated by the second communications/control module 106B. In some embodiments, the second communications/control module 106B is configured to validate the authentication datagram 206 by verifying the second signature associated with the first and second nonces (sigA[NonceA||NonceB]). In some embodiments, the second communications/control module 106B is configured to verify the second signature (sigA[NonceA||NonceB]) by concatenating the first plaintext nonce (NonceA) received from the first communications/control module 106A and the second locally stored nonce (NonceB), verifying the second cryptographic signature (sigA[NonceA||NonceB]) with a public device authentication key (e.g., using DAKA from certDAKA), and comparing the locally generated concatenation of the first nonce and the second nonce with the cryptographically verified concatenation of the first nonce and the second nonce. In addition to the error reporting message, when the second communications/control module 106B fails to validate the authentication datagram, the second communications/control module 106B may partially or completely disable the first communications/control module 106A, and/or discontinue or restrict communications to/from the first communications/control module 106A.

In implementations where the communications/control modules 106 are arranged according to a "master-slave" configuration, the master (e.g., the first communications/control module 106A) may be configured to authenticate each slave. In the event of a failed authentication, the master may at least partially disable or restrict communications to/from the unauthenticated slave. Alternatively, two or more slave communications/control modules 106 and/or two or more communications/control modules 106 operating in parallel without a master may authenticate one another. A failed authentication may result in both devices or a pseudo-secondary device (e.g., non-initiating communications/control module) being partially or completely disabled. For example, two or more redundant communications/control modules 106 can be disabled should they fail to successfully complete the authentication sequence at startup or another predefined time/event.

Figure 3:
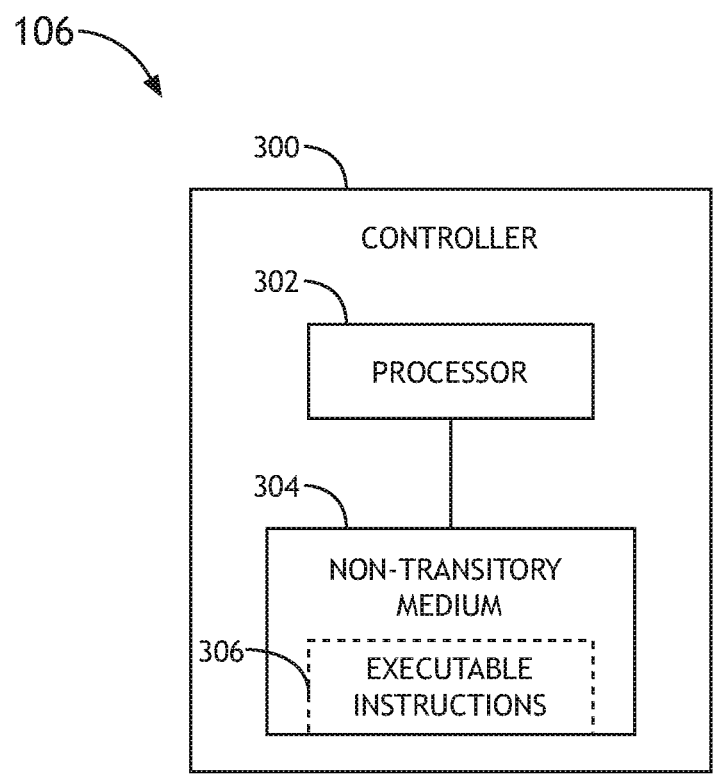
FIG. 3 is a block diagram illustrating a communications/control module in accordance with example embodiments of the present disclosure.

Each communications/control module 106 may include circuitry and/or logic enabled to perform the functions described herein. As shown in FIG. 3, embodiments of the communications/control module 106 include a controller 300 having at least one processor 302 configured to execute program instruction 306 stored permanently, semi-permanently, or temporarily by a non-transitory machine readable medium 304 such as a hard disk drive (HDD), solid-state disk (SDD), optical disk, magnetic storage device, flash drive, or the like. For example, each communications/control module 106 may include a controller 300 configured to carry out an authentication initiator sequence 400 and/or an authentication responder sequence 500 illustrated in FIGS. 4 and 5, respectively.

Figure 4:
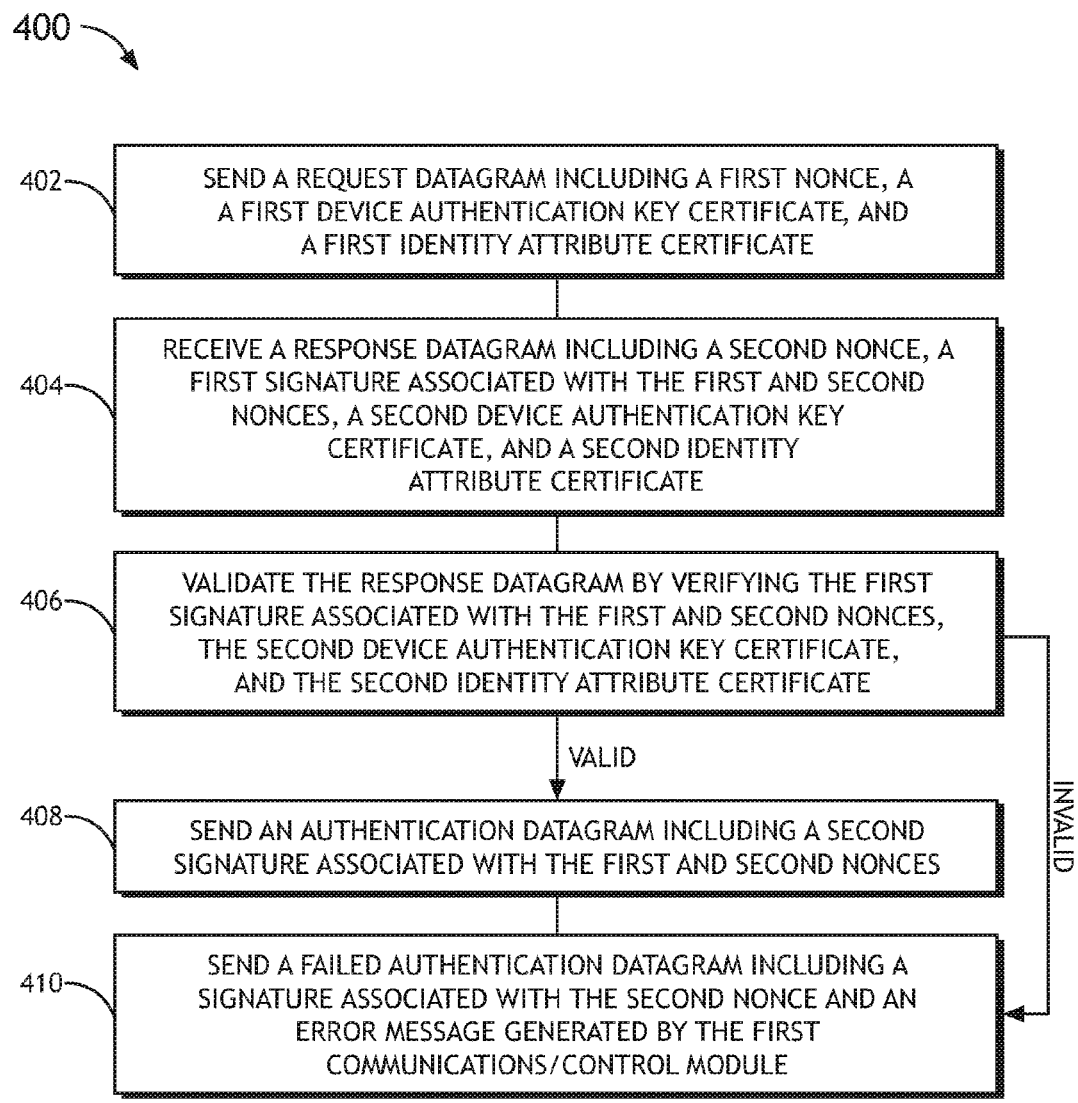
FIG. 4 is a flow diagram illustrating an authentication sequence performed by a first communications/control module authenticating with a second communications/control module in accordance with example embodiments of the present disclosure.

Referring to FIG. 4, the authentication initiator sequence 400 implemented by the first communications/control module 106A (i.e., the initiator) includes: (402) sending a request datagram to a second communications/control module 106B (i.e. the responder), the request datagram including a first nonce, a first device authentication key certificate, and a first identity attribute certificate; (404) receiving a response datagram from the second communications/control module 106B, the response datagram including a second nonce, a first signature associated with the first and second nonces, a second device authentication key certificate, and a second identity attribute certificate; (406) validating the response datagram by verifying the first signature associated with the first and second nonces, the second device authentication key certificate, and the second identity attribute certificate; and (410) sending an authentication datagram to the second communications/control module 106B when the response datagram is valid, the authentication datagram including a second signature associated with the first and second nonces; or (408) sending a failed authentication datagram to the second communications/control module 106B when the response datagram is invalid, the failed authentication datagram including a signature associated with the second nonce and an error message.

Figure 5:
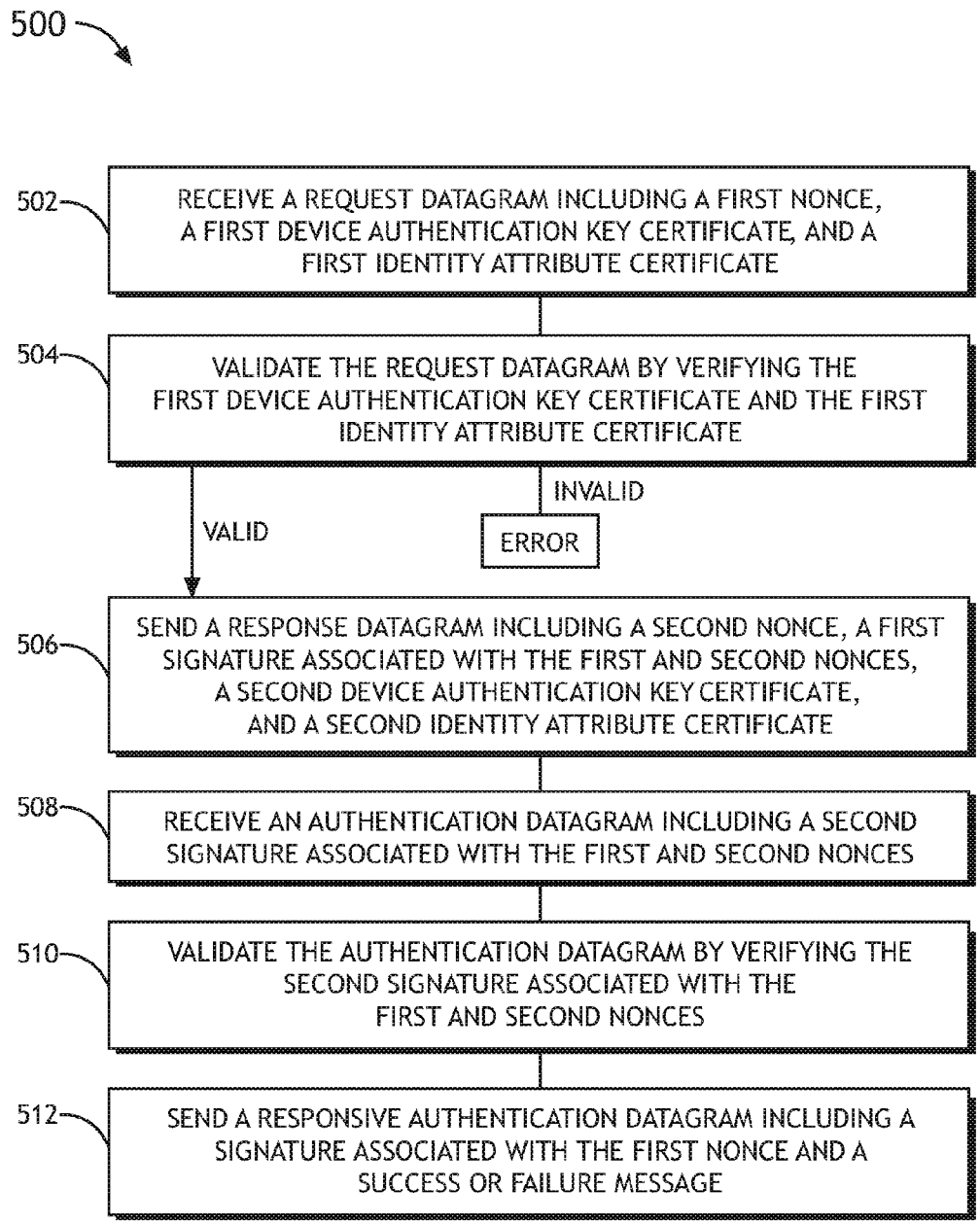
FIG. 5 is a flow diagram illustrating a responsive authentication sequence performed by a second communications/control module in response to an authentication sequence (e.g., as illustrated in FIG. 4) performed by a first communications/control module in accordance with example embodiments of the present disclosure.

Referring to FIG. 5, the authentication responder sequence 500 implemented by the second communications/control module 106B includes: (502) receiving a request datagram from the first communications/control module 106A, the request datagram including a first nonce, a first device authentication key certificate, and a first identity attribute certificate; (504) validating the request datagram by verifying the first device authentication key certificate and the first identity attribute certificate; (506) sending a response datagram to the first communications/control module 106A when the request datagram is valid, the response datagram including a second nonce, a first signature associated with the first and second nonces, a second device authentication key certificate, and a second identity attribute certificate; (508) receiving an authentication datagram from the first communications/control module 106A, the authentication datagram including a second signature associated with the first and second nonces; (510) validating the authentication datagram by verifying the second signature associated with the first and second nonces; and (512) sending a responsive authentication datagram to the first communications/control module 106A, the responsive authentication datagram including a signature associated with the first nonce and a success or failure message.

In some embodiments, other elements of the industrial control system 100, such as I/O modules 104, field devices 130 (e.g. sensors or actuators), power modules 112, physical interconnect devices, switches, and so forth, can be configured to authenticate one another by performing a sequence or handshake such as the authentication sequence (between redundant communications/control modules) described above. For example, a first I/O module 104 and a second I/O module 104 can be configured to perform the authentication functions or operations carried out by the first communications/control module 106A and the second communications/control module 106B, respectively, to complete an authentication sequence with one another.

Referring again to FIG. 1, data transmitted by the industrial control system 100 can be packetized, i.e., discrete portions of the data can be converted into data packets comprising the data portions along with network control information, and so forth. The industrial control system 100 can use one or more protocols for data transmission, including a bit-oriented synchronous data link layer protocol such as High-Level Data Link Control (HDLC). In some embodiments, the industrial control system 100 implements HDLC according to an International Organization for Standardization (ISO) 13239 standard, or the like. Further, two or more control modules 106 can be used to implement redundant HDLC. However, it should be noted that HDLC is provided by way of example only and is not meant to be restrictive of the present disclosure. Thus, the industrial control system 100 can use other various communications protocols in accordance with the present disclosure.

One or more of the communications/control module 106 can be configured for exchanging information with components used for monitoring and/or controlling the field devices 130 (e.g., sensor and/or actuator instrumentation) connected to the industrial control system 100 via the I/O modules 104, such as one or more control loop feedback mechanisms/controllers. In implementations, a controller can be configured as a microcontroller/Programmable Logic Controller (PLC), a Proportional-Integral-Derivative (PID) controller, and so forth. In some embodiments, the I/O modules 104 and the communications/control modules 106 include network interfaces, e.g., for connecting one or more I/O modules 104 to one or more controllers via a network. In implementations, a network interface can be configured as a Gigabit Ethernet interface for connecting the I/O modules 104 to a Local Area Network (LAN). Further, two or more communications/control modules 106 can be used to implement redundant Gigabit Ethernet. However, it should be noted that Gigabit Ethernet is provided by way of example only and is not meant to be restrictive of the present disclosure. Thus, a network interface can be configured for connecting the communications/control modules 106 to other various networks including, but not necessarily limited to: a wide-area cellular telephone network, such as a 3G cellular network, a 4G cellular network, or a GSM network; a wireless computer communications network, such as a Wi-Fi network (e.g., a WLAN operated using IEEE 802.11 network standards); a PAN (e.g., a WPAN operated using IEEE 802.15 network standards); a WAN; an intranet; an extranet; an internet; the Internet; and so on. Additionally, a network interface can be implemented using a computer bus. For example, a network interface can include a Peripheral Component Interconnect (PCI) card interface, such as a Mini PCI interface, and so forth. Further, the network can be configured to include a single network or multiple networks across different access points.

The industrial control system 100 can receive electrical power from multiple sources. For example, AC power is supplied from a power grid 108 (e.g., using high voltage power from AC mains). AC power can also be supplied using local power generation (e.g., an on-site turbine or diesel local power generator 110). A power supply 112 is used to distribute electrical power from the power grid 108 to automation equipment of the industrial control system 100, such as controllers, I/O modules, and so forth. A power supply 112 can also be used to distribute electrical power from the local power generator 110 to the industrial control system equipment. The industrial control system 100 can also include additional (backup) power supplies configured to store and return DC power using multiple battery modules. For example, a power supply 112 functions as a UPS. In embodiments of the disclosure, multiple power supplies 112 can be distributed (e.g., physically decentralized) within the industrial control system 100.

In some embodiments, the control elements/subsystems and/or industrial elements (e.g., the I/O modules 104, the communications/control modules 106, the power supplies 112, and so forth) are connected together by one or more backplanes 114. For example, communications/control modules 106 can be connected to I/O modules 104 by a communications backplane 116. Further, power supplies 112 can be connected to I/O modules 104 and/or to communications/control modules 106 by a power backplane 118. In some embodiments, physical interconnect devices (e.g., switches, connectors, or cables such as, but not limited to, those described in U.S. Non-provisional application Ser. No. 14/446,412) are used to connect to the I/O modules 104, the communications/control modules 106, the power supplies 112, and possibly other industrial control system equipment. For example, a cable can be used to connect a communications/control module 106 to a network 120, another cable can be used to connect a power supply 112 to a power grid 108, another cable can be used to connect a power supply 112 to a local power generator 110, and so forth.

In some embodiments, the industrial control system 100 implements a secure control system. For example, the industrial control system 100 includes a security credential source (e.g., a factory 122) and a security credential implementer (e.g., a key management entity 124). The security credential source is configured to generate a unique security credential (e.g., a key, a certificate, etc., such as a unique identifier, and/or a security credential). The security credential implementer is configured to provision the control elements/subsystems and/or industrial elements (e.g., cables, devices 130, I/O modules 104, communications/control modules 106, power supplies 112, and so forth) with a unique security credential generated by the security credential source.

Multiple (e.g., every) device 130, I/O module 104, communications/control module 106, power supply 112, physical interconnect devices, etc., of the industrial control system 100 can be provisioned with security credentials for providing security at multiple (e.g., all) levels of the industrial control system 100. Still further, the control elements/subsystems and/or industrial elements including the sensors and/or actuators and so forth, can be provisioned with the unique security credentials (e.g., keys, certificates, etc.) during manufacture (e.g., at birth), and can be managed from birth by a key management entity 124 of the industrial control system 100 for promoting security of the industrial control system 100.

In some embodiments, communications between the control elements/subsystems and/or industrial elements including the sensors and/or actuators and so forth, of the industrial control system 100 includes an authentication process. The authentication process can be performed for authenticating control elements/subsystem and/or industrial elements including the sensors and/or actuators and so forth, implemented in the industrial control system 100. Further, the authentication process can utilize security credentials associated with the element and/or physical interconnect device for authenticating that element and/or physical interconnect device. For example, the security credentials can include encryption keys, certificates (e.g., public key certificates, digital certificates, identity certificates, security certificates, asymmetric certificates, standard certificates, non-standard certificates) and/or identification numbers.

In implementations, multiple control elements/subsystems and/or industrial elements of the industrial control system 100 are provisioned with their own unique security credentials. For example, each element of the industrial control system 100 may be provisioned with its own unique set(s) of certificates, encryption keys and/or identification numbers when the element is manufactured (e.g., the individual sets of keys and certificates are defined at the birth of the element). The sets of certificates, encryption keys and/or identification numbers are configured for providing/supporting strong encryption. The encryption keys can be implemented with standard (e.g., commercial off-the-shelf (COTS)) encryption algorithms, such as National Security Agency (NSA) algorithms, National Institute of Standards and Technology (NIST) algorithms, or the like.

The cryptographic keys and certificates can be stored in on-chip memory (OCM), for example, in SRAM of a communications/control module 106. Additionally, sensitive tasks (e.g., tasks with secret information and sometimes even with public information) may have a stack that executes in OCM. For example, cryptographic tasks may be performed in kernel space or application space from stacks locally stored in OCM.

Based upon the results of the authentication process, the element being authenticated can be activated, partial functionality of the element can be enabled or disabled within the industrial control system 100, complete functionality of the element can be enabled within the industrial control system 100, and/or functionality of the element within the industrial control system 100 can be completely disabled (e.g., no communication facilitated between that element and other elements of the industrial control system 100).

In embodiments, the keys, certificates and/or identification numbers associated with an element of the industrial control system 100 can specify the original equipment manufacturer (OEM) of that element. As used herein, the term "original equipment manufacturer" or "OEM" can be defined as an entity that physically manufactures the device (e.g., element) and/or a supplier of the device such as an entity that purchases the device from a physical manufacturer and sells the device. Thus, in embodiments, a device can be manufactured and distributed (sold) by an OEM that is both the physical manufacturer and the supplier of the device. However, in other embodiments, a device can be distributed by an OEM that is a supplier, but is not the physical manufacturer. In such embodiments, the OEM can cause the device to be manufactured by a physical manufacturer (e.g., the OEM can purchase, contract, order, etc. the device from the physical manufacturer).

Additionally, where the OEM comprises a supplier that is not the physical manufacturer of the device, the device can bear the brand of the supplier instead of brand of the physical manufacturer. For example, in embodiments where an element (e.g., a communications/control module 106) is associated with a particular OEM that is a supplier but not the physical manufacturer, the element's keys, certificates and/or identification numbers can specify that origin. During authentication of an element of the industrial control system 100, when a determination is made that an element being authenticated was manufactured or supplied by an entity that is different than the OEM of one or more other elements of the industrial control system 100, then the functionality of that element can be at least partially disabled within the industrial control system 100. For example, limitations can be placed upon communication (e.g., data transfer) between that element and other elements of the industrial control system 100, such that the element cannot work/function within the industrial control system 100. When one of the elements of the industrial control system 100 requires replacement, this feature can prevent a user of the industrial control system 100 from unknowingly replacing the element with a non-homogenous element (e.g., an element having a different origin (a different OEM) than the remaining elements of the industrial control system 100) and implementing the element in the industrial control system 100. In this manner, the techniques described herein can prevent the substitution of elements of other OEM's into a secure industrial control system 100. In one example, the substitution of elements that furnish similar functionality in place of elements provided by an originating OEM can be prevented, since the substituted elements cannot authenticate and operate within the originating OEM's system. In another example, a first reseller can be provided with elements having a first set of physical and cryptographic labels by an originating OEM, and the first reseller's elements can be installed in an industrial control system 100. In this example, a second reseller can be provided with elements having a second (e.g., different) set of physical and cryptographic labels by the same originating OEM. In this example, the second reseller's elements may be prevented from operating within the industrial control system 100, since they may not authenticate and operate with the first reseller's elements. However, it should also be noted that the first reseller and the second reseller may enter into a mutual agreement, where the first and second elements can be configured to authenticate and operate within the same industrial control system 100. Further, in some embodiments, an agreement between resellers to allow interoperation can also be implemented so the agreement only applies to a specific customer, group of customers, facility, etc.

In another instance, a user can attempt to implement an incorrectly designated (e.g., mismarked) element within the industrial control system 100. For example, the mismarked element can have a physical indicia marked upon it which falsely indicates that the element is associated with the same OEM as the OEM of the other elements of the industrial control system 100. In such instances, the authentication process implemented by the industrial control system 100 can cause the user to be alerted that the element is counterfeit. This process can also promote improved security for the industrial control system 100, since counterfeit elements are often a vehicle by which malicious software can be introduced into the industrial control system 100. In embodiments, the authentication process provides a secure air gap for the industrial control system 100, ensuring that the secure industrial control system is physically isolated from insecure networks.

In implementations, the secure industrial control system 100 includes a key management entity 124. The key management entity 124 can be configured for managing cryptographic keys (e.g., encryption keys) in a cryptosystem. This managing of cryptographic keys (e.g., key management) can include the generation, exchange, storage, use, and/or replacement of the keys. For example, the key management entity 124 is configured to serve as a security credentials source, generating unique security credentials (e.g., public security credentials, secret security credentials) for the elements of the industrial control system 100. Key management pertains to keys at the user and/or system level (e.g., either between users or systems).

In embodiments, the key management entity 124 comprises a secure entity such as an entity located in a secure facility. The key management entity 124 can be remotely located from the I/O modules 104, the communications/control modules 106, and the network 120. For example, a firewall 126 can separate the key management entity 124 from the control elements or subsystems 102 and the network 120 (e.g., a corporate network). In implementations, the firewall 126 can be a software and/or hardware-based network security system that controls ingoing and outgoing network traffic by analyzing data packets and determining whether the data packets should be allowed through or not, based on a rule set. The firewall 126 thus establishes a barrier between a trusted, secure internal network (e.g., the network 120) and another network 128 that is not assumed to be secure and trusted (e.g., a cloud and/or the Internet). In embodiments, the firewall 126 allows for selective (e.g., secure) communication between the key management entity 124 and one or more of the control elements or subsystems 102 and/or the network 120. In examples, one or more firewalls can be implemented at various locations within the industrial control system 100. For example, firewalls can be integrated into switches and/or workstations of the network 120.

The secure industrial control system 100 can further include one or more manufacturing entities (e.g., factories 122). The manufacturing entities can be associated with original equipment manufacturers (OEMs) for the elements of the industrial control system 100. The key management entity 124 can be communicatively coupled with the manufacturing entity via a network (e.g., a cloud). In implementations, when the elements of the industrial control system 100 are being manufactured at one or more manufacturing entities, the key management entity 124 can be communicatively coupled with (e.g., can have an encrypted communications pipeline to) the elements. The key management entity 124 can utilize the communications pipeline for provisioning the elements with security credentials (e.g., inserting keys, certificates and/or identification numbers into the elements) at the point of manufacture.

Further, when the elements are placed into use (e.g., activated), the key management entity 124 can be communicatively coupled (e.g., via an encrypted communications pipeline) to each individual element worldwide and can confirm and sign the use of specific code, revoke (e.g., remove) the use of any particular code, and/or enable the use of any particular code. Thus, the key management entity 124 can communicate with each element at the factory where the element is originally manufactured (e.g., born), such that the element is born with managed keys. A master database and/or table including all encryption keys, certificates and/or identification numbers for each element of the industrial control system 100 can be maintained by the key management entity 124. The key management entity 124, through its communication with the elements, is configured for revoking keys, thereby promoting the ability of the authentication mechanism to counter theft and re-use of components.

In implementations, the key management entity 124 can be communicatively coupled with one or more of the control elements/subsystems, industrial elements, and/or the network 120 via another network (e.g., a cloud and/or the Internet) and firewall. For example, in embodiments, the key management entity 124 can be a centralized system or a distributed system. Moreover, in embodiments, the key management entity 124 can be managed locally or remotely. In some implementations, the key management entity 124 can be located within (e.g., integrated into) the network 120 and/or the control elements or subsystems 102. The key management entity 124 can provide management and/or can be managed in a variety of ways. For example, the key management entity 124 can be implemented/managed: by a customer at a central location, by the customer at individual factory locations, by an external third party management company and/or by the customer at different layers of the industrial control system 100, and at different locations, depending on the layer.

Varying levels of security (e.g., scalable, user-configured amounts of security) can be provided by the authentication process. For example, a base level of security can be provided which authenticates the elements and protects code within the elements. Other layers of security can be added as well. For example, security can be implemented to such a degree that a component, such as the communications/control module 106, cannot power up without proper authentication occurring. In implementations, encryption in the code is implemented in the elements, while security credentials (e.g., keys and certificates) are implemented on the elements. Security can be distributed (e.g., flows) through the industrial control system 100. For example, security can flow through the industrial control system 100 all the way to an end user, who knows what a module is designed to control in that instance. In embodiments, the authentication process provides encryption, identification of devices for secure communication and authentication of system hardware or software components (e.g., via digital signature).

In implementations, the authentication process can be implemented to provide for and/or enable interoperability within the secure industrial control system 100 of elements manufactured and/or supplied by different manufacturers/vendors/suppliers (e.g., OEMs). For example, selective (e.g., some) interoperability between elements manufactured and/or supplied by different manufacturers/vendors/suppliers can be enabled. In embodiments, unique security credentials (e.g., keys) implemented during authentication can form a hierarchy, thereby allowing for different functions to be performed by different elements of the industrial control system 100.

The communication links connecting the components of the industrial control system 100 can further employ data packets, such as runt packets (e.g., packets smaller than sixty-four (64) bytes), placed (e.g., injected and/or stuffed) therein, providing an added level of security. The use of runt packets increases the level of difficulty with which outside information (e.g., malicious content such as false messages, malware (viruses), data mining applications, etc.) can be injected onto the communications links. For example, runt packets can be injected onto a communication link within gaps between data packets transmitted between a first communications/control module 106A and a second communications/control module 106B to hinder an external entity's ability to inject malicious content onto the communication link.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A secure industrial control system, comprising:
a set of redundant industrial elements, each of the redundant industrial elements including at least one respective processor coupled to a respective non-transitory medium that stores instructions executable by the at least one respective processor; the set of redundant industrial elements including a first industrial element and a second industrial element, the first and second industrial elements being configured to perform an authentication sequence, the authentication sequence including:
transmitting a request datagram from the first industrial element to the second industrial element, the request datagram including a first nonce, a first device authentication key certificate, and a first identity attribute certificate;
transmitting a response datagram from the second industrial element to the first industrial element, the response datagram including a second nonce, a first signature associated with the first and second nonces, a second device authentication key certificate, and a second identity attribute certificate;
validating the response datagram at the first industrial element by verifying the first signature associated with the first and second nonces, the second device authentication key certificate, and the second identity attribute certificate, wherein the first industrial element is configured to verify the first signature associated with the first and second nonces by concatenating the first nonce and the second nonce, cryptographically verifying the first signature associated with the first and second nonces with a public device authentication key, and comparing the locally generated concatenation of the first nonce and the second nonce with a cryptographically verified concatenation of the first nonce and the second nonce;

transmitting an authentication datagram from the first industrial element to the second industrial element when the response datagram is valid, the authentication datagram including a second signature associated with the first and second nonces; and transmitting a failed authentication datagram from the first industrial element to the second industrial element when the response datagram is invalid, the failed authentication datagram including a signature associated with the second nonce and an error message generated by the first industrial element.

2. The industrial control system of claim 1, wherein the authentication sequence performed by the first and second industrial elements further comprises:

transmitting a responsive authentication datagram from the second industrial element to the first industrial element, the responsive authentication datagram including a signature associated with the first nonce and a success or failure message generated by the second industrial element.

3. The secure industrial control system of claim 1, wherein at least one of the first nonce and the second nonce comprises a random nonce generated by a true random number generator.

4. The secure industrial control system of claim 1, wherein the second industrial element is configured to generate the first signature associated with the first and second nonces by concatenating the first nonce and the second nonce, and signing the concatenation of the first nonce and the second nonce, and wherein the first industrial element is configured to generate the second signature associated with the first and second nonces by concatenating the first nonce and the second nonce, and signing the concatenation of the first nonce and the second nonce.

5. The secure industrial control system of claim 1, wherein the second industrial element is further configured to validate the request datagram by verifying the first device authentication key certificate and the first identity attribute certificate.

6. The secure industrial control system of claim 1, wherein the second industrial element, in response to receiving the authentication datagram from the first industrial element, is configured to verify the second signature associated with the first and second nonces by concatenating the first nonce and the second nonce, cryptographically verifying the second signature associated with the first and second nonces with a public device authentication key, and comparing the locally generated concatenation of the first nonce and the second nonce with a cryptographically verified concatenation of the first nonce and the second nonce.

7. The secure industrial control system of claim 1, wherein the first and second industrial elements are configured to perform the authentication sequence in response to at least one of: a startup/reset event; an installation of the first industrial element or the second industrial element; a periodic time event; or scheduled time event.

8. The secure industrial control system of claim 1, wherein the redundant industrial elements comprise at least one of: redundant communications/control modules, redundant input/output modules; redundant power modules; redundant field devices; redundant switches; redundant workstations; or redundant physical interconnect devices.

9. The secure industrial control system of claim 1, wherein the first industrial element is configured to initiate the authentication sequence in response to an installation of the second industrial element.

10. The secure industrial control system of claim 1, wherein the second industrial element is configured to take over for the first industrial element when the first industrial element experiences a failure event.

11. The secure industrial control system of claim 1, wherein the first industrial element is further configured to at least partially disable or restrict communications of the second industrial element when the second industrial element fails to authenticate with the first industrial element.

12. A secure industrial control system, comprising:

a first industrial element including at least one respective processor coupled to a respective non-transitory medium that stores instructions executable by the at least one respective processor of the first industrial element; and a second industrial element including at least one respective processor coupled to a respective non-transitory medium that stores instructions executable by the at least one respective processor of the second industrial element, wherein the first and second industrial elements are configured to perform an authentication sequence, the authentication sequence including:

transmitting a request datagram from the first industrial element to the second industrial element, the request datagram including a first nonce, a first device authentication key certificate, and a first identity attribute certificate;

transmitting a response datagram from the second industrial element to the first industrial element, the response datagram including a second nonce, a first signature associated with the first and second nonces, a second device authentication key certificate, and a second identity attribute certificate;

validating the response datagram at the first industrial element by verifying the first signature associated with the first and second nonces, the second device authentication key certificate, and the second identity attribute certificate, wherein the first industrial element is configured to verify the first signature associated with the first and second nonces by concatenating the first nonce and the second nonce, cryptographically verifying the first signature associated with the first and second nonces with a public device authentication key, and comparing the locally generated concatenation of the first nonce and the second nonce with a cryptographically verified concatenation of the first nonce and the second nonce;

transmitting an authentication datagram from the first industrial element to the second industrial element when the response datagram is valid, the authentication datagram including a second signature associated with the first and second nonces; and transmitting a failed authentication datagram from the first industrial element to the second industrial element when the response datagram is invalid, the failed authentication datagram including a signature associated with the second nonce and an error message generated by the first industrial element.

13. The secure industrial control system of claim 12, wherein the first and second industrial elements are configured to perform the authentication sequence in response to at least one of: a startup/reset event; an installation of the first industrial element or the second industrial element; a periodic time event; or scheduled time event.

14. The secure industrial control system of claim 12, wherein each industrial element of the first and second industrial elements comprises at least one of: a communications/control module, an input/output module; a power module; a field device; a switch; a workstation; or a physical interconnect device.

15. The secure industrial control system of claim 12, wherein the first industrial element is configured to initiate the authentication sequence in response to an installation of the second industrial element.

16. The secure industrial control system of claim 12, wherein the second industrial element is configured to take over for the first industrial element when the first industrial element experiences a failure event.

17. The secure industrial control system of claim 12, wherein the first industrial element is further configured to at least partially disable or restrict communications of the second industrial element when the second industrial element fails to authenticate with the first industrial element.

18. A method of authenticating redundant industrial elements including at least a first industrial element and a second industrial element, the method comprising:
    transmitting a request datagram from the first industrial element to the second industrial element, the request datagram including a first nonce, a first device authentication key certificate, and a first identity attribute certificate;
    transmitting a response datagram from the second industrial element to the first industrial element, the response datagram including a second nonce, a first signature associated with the first and second nonces, a second device authentication key certificate, and a second identity attribute certificate;
    validating the response datagram at the first industrial element by verifying the first signature associated with the first and second nonces, the second device authentication key certificate, and the second identity attribute certificate, wherein verifying the first signature associated with the first and second nonces includes concatenating the first nonce and the second nonce, cryptographically verifying the first signature associated with the first and second nonces with a public device authentication key, and comparing the locally generated concatenation of the first nonce and the second nonce with a cryptographically verified concatenation of the first nonce and the second nonce;
    transmitting an authentication datagram from the first industrial element to the second industrial element when the response datagram is valid, the authentication datagram including a second signature associated with the first and second nonces; and
    transmitting a failed authentication datagram from the first industrial element to the second industrial element when the response datagram is invalid, the failed authentication datagram including a signature associated with the second nonce and an error message generated by the first industrial element.

* * * * *